OR    3,825,316

United Sta ... Amodei

[11] 3,825,316
[45] July 23, 1974

[54] APPARATUS FOR PROVIDING AN OPTICAL SYSTEM USING ADAPTIVE HOLOGRAPHIC COMPONENTS

[75] Inventor: Juan Jose Amodei, Langhorne, Pa.

[73] Assignee: RCA Corporation, New York, N.Y.

[22] Filed: Apr. 24, 1972

[21] Appl. No.: 246,653

[52] U.S. Cl.................. 350/3.5, 350/147, 350/162
[51] Int. Cl........................ G02b 5/18, G02b 27/00
[58] Field of Search...................... 350/150, 162 R; 331/94.5 C; 330/3.5

[56] References Cited
UNITED STATES PATENTS

| | | | |
|---|---|---|---|
| 3,272,988 | 9/1966 | Bloom et al. | 350/150 |
| 3,329,474 | 7/1967 | Harris et al. | 350/150 |
| 3,407,294 | 10/1968 | Hill | 331/94.5 C |
| 3,410,624 | 11/1968 | Schmidt | 350/150 |
| 3,544,189 | 12/1970 | Chen et al. | 350/3.5 |
| 3,622,220 | 11/1971 | Kogelnik | 350/162 R |

*Primary Examiner*—Ronald J. Stern
*Assistant Examiner*—Matthew W. Koren
*Attorney, Agent, or Firm*—Edward J. Norton; Glenn H. Bruestle; Irwin M. Krittman

[57] ABSTRACT

A laser produces a beam of polarized coherent light which is transmitted through a polarization switching device that adjusts the orientation of the plane of polarization of the transmitted light in either one of two mutually orthogonal states in response to an input signal. The light transmitted by the polarization switching device then impinges on a transparent electro-optic crystal material whose index of refraction along its C-axis varies in accordance with the interference fringes of a preestablished holographic pattern. In one embodiment, the optical system includes an electro-optic beam deflector to provide a strongly polarization dependent digital laser beam deflection system, whereby the beam will be deflected in a different predetermined direction depending on the polarization state of the beam. In another embodiment, the optical system includes a complex optical component to provide light deflection apparatus for selectively deflecting a beam of light from a source to one of a plurality of discrete target positions.

2 Claims, 3 Drawing Figures

APPARATUS FOR PROVIDING AN OPTICAL SYSTEM USING ADAPTIVE HOLOGRAPHIC COMPONENTS

BACKGROUND OF THE INVENTION

The present invention relates to a method and apparatus for providing optical systems and, more particularly, to such systems employing adaptive optical components having a preestablished polarization dependent hologram stored therein and operative under polarization control for deflecting a light beam from a source to a selected target position.

In the prior art optical systems are commonly used to provide beam steering or deflection of a beam generated by, for example, a laser for beam scanning of optical memory devices or digital communications. Prior art devices such as refractors and deflectors are placed in the path of the generated beam and means are provided to change the effective index of refraction of these devices using the electro-optic effect or the acousto-optic effect. Another prior art device uses the changing of the reflectance characteristic of the device through modulation of surface reflectivity or mechanical scanning. In those systems, using these prior art devices, where the light beam must be accurately deflected there are basically two techniques for achieving the desired accuracy, (i) using an optical deflection system which inherently provides adequate precision and stability, and (ii) using an imprecise deflector with a precise, stable and accurate deflection sensor in a closed-loop automatic deflection control servomechanism. These prior art deflection systems have the disadvantage that they are difficult and expensive to construct in order to accurately provide the desired deflection angle. Further disadvantages in prior art systems are that the obtainable deflection angle is relatively limited and the transmission efficiency is also relatively low. Another disadvantage in some of the prior art deflectors is that a residual beam remains in one or all of the target positions which cannot easily be removed. These disadvantages are overcome by the present invention which provides an optical system capable of wide deflection angles and which is relatively insensitive to alignment conditions. Further, the present invention provides relatively high transmission efficiency and the capability of eliminating residual light beams. Additionally, the invention incorporates the option of spatially modulating or altering the wavefront of the beam being deflected, thus combining in one device the functions of a beam deflector and an optical component.

SUMMARY OF THE INVENTION

Briefly, the present invention provides an optical system comprising means for producing a beam of polarized coherent light, means operating on the beam for selectively controlling the beam to be polarized in either one of two mutually orthogonal directions in response to a control signal and an optical component disposed in the path of the light beam. The optical component comprising a substantially transparent electro-optic material whose index of refraction along a given direction varies in accordance with the interference fringes of a predetermined holographic pattern that has been recorded therein. The electro-optic material is positioned in the path of the beam with the given direction oriented to substantially diffract the beam in accordance with the pattern to a first target position only when the beam has one of the mutually orthogonal polarization states and for substantially transmitting the beam to a second target position only when the beam has the other of the mutually orthogonal polarization states.

DETAILED DESCRIPTION

Figure 1:
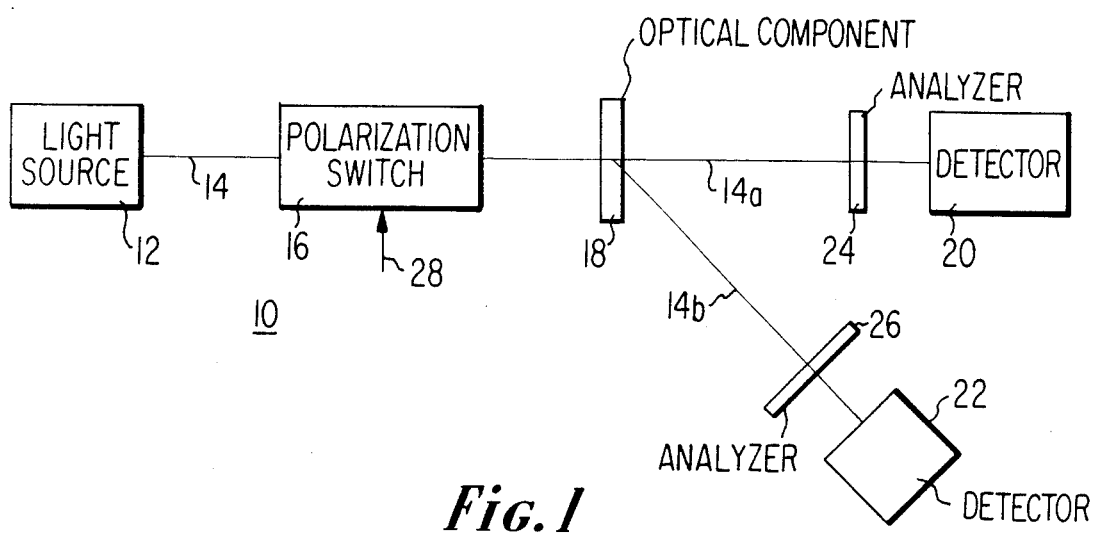
FIG. 1 is a schematic view of a digital laser beam deflector illustrating one embodiment of the present invention.

The optical system of FIG. 1 is arranged to provide a digital laser beam deflection system 10. Source 12 provides a beam of polarized coherent light 14 which in turn is transmitted through a polarization switching device 16. The light transmitted by device 16 impinges on an optical component 18. The laser beam target positions are depicted as detectors 20 and 22. Analyzers 24 and 26 are arranged between optical component 18 and detectors (or targets) 20 and 22 respectively.

Source 12 may comprise a laser source which provides a polarized light output such as, for example, a laser cavity equipped with Brewster windows. Alternately, source 12 may comprise a laser having an unpolarized output which is cascaded with one or more polarizers. Polarization switching device 16 acts to present a light beam having a linear polarization in one of two mutually orthogonal states. Switching device 16 includes a control input 28. In one condition when switching device 16 is deactivated, the polarization of the impinging light beam remains unaffected. When switching device 16 is activated by applying an input signal to control input 28, the switching device 16 rotates the polarization state to the mutually orthogonal state. The optical component 18 responds to the polarization of the impinging light beam 14 to provide one of two possible output beams; the first beam being transmitted through, and the second beam being deflected by optical component 18. The first output beam 14a which has a polarization corresponding to the first mutually orthogonal state, is transmitted through analyzer 24 to detector 20. The second output beam 14b which corresponds to the second mutually orthogonal state, is transmitted through analyzer 26 to detector 22. Analyzers 24 and 26 act to selectively transmit the light transmitted by optical component 18. In this manner the presence of residual beams at detectors 20 and 22 is virtually eliminated. Detectors 20 and 22 may comprise, for example, photodetectors which provide an output in response to the light transmitted by analyzers 24 and 26 respectively.

Optical component 18 is preferably made of a transparent electro-optic crystalline substance which exhibits anisotropic optical properties. It is known that phase holograms can be recorded in electro-optic materials of this type. This phenomenon occurs when during exposure to a light pattern such as that due to the intersection of two intersecting beams of coherent light free electrons within the crystal migrate or move away from the regions of high light intensity and are then retrapped. The resulting charge displacement establishes an electric field. If the material has a high linear electro-optic coefficient, its index of refraction along a given direction will be modulated in accordance with the electric field. Thus, the exposure to a light interference pattern results in variations in the index of refraction that will approximate the shape of the light intensity pattern, and the changes will persist as long as the charge displacement, which establishes the electric field, remains fixed. It should be apparent that the variations in index of refraction produce a phase hologram that can be read out by exposing the electro-optic crystal material with a reference beam of coherent light which illuminates the crystal at the same incidence angle as one of the two original intersecting beams. The readout or reference beam incident on the phase hologram in this manner gives rise to a diffracted output beam which is identical in amplitude and phase distribution with the other of the two original intersecting beams.

Phase holograms recorded in certain electro-optic crystal materials in the above-described manner exhibit a strongly polarization dependent readout characteristic. That is, only light having a given polarization direction will be strongly diffracted. For example, if a hologram is recorded in such a crystal with the two recording beam directions in the plane of the C-axis, the fringes of the hologram representing the induced variations in the index of refraction will be perpendicular to the C-axis, so that the nature of the electro-optic effect provides a modulation of the index of refraction only for readout light whose polarization is aligned along the C-axis of the crystal. Thus, the holographic image is produced only for light of this polarization, and light with a polarization perpendicular to the C-axis passes through the transparent crystal substantially undiffracted.

Suitable candidates for the optical component 18 having this electro-optic effect are lithium niobate $LiNbO_3$ and barium sodium niobate $Ba_2NaNb_6O_{15}$. The use of these and other materials in information storage systems generally is disclosed in U.S. Pat. application, Ser. No. 44,195, filed on June 8, 1970, in the name of J. J. Amodei, now U.S. Pat. No. 3,651,488 and assigned to the assignee of this invention. Crystals, such as lithium niobate or barium sodium niobate, are particularly suitable in these applications as the holographic information can be "fixed" so as to provide a non-destructive readout for the holographic image or other information stored in the crystal material. The fixing technique is described fully in U.S. Pat. application Ser. No. 295,851, filed Oct. 10, 1972, a continuation-in-part of now-abandoned U.S. Pat. application, Ser. No. 144,905, filed on May 19, 1971, in the names of J. J. Amodei and D. L. Staebler and assigned to the same assignee of this invention. This fixing technique is also discussed generally in "Holographic Pattern Fixing in Electro-Optic Crystals" by J. J. Amodei; and David L. Staebler, "Applied Physics Letters", Volume 18, No. 12, Page 540.

Figure 2:
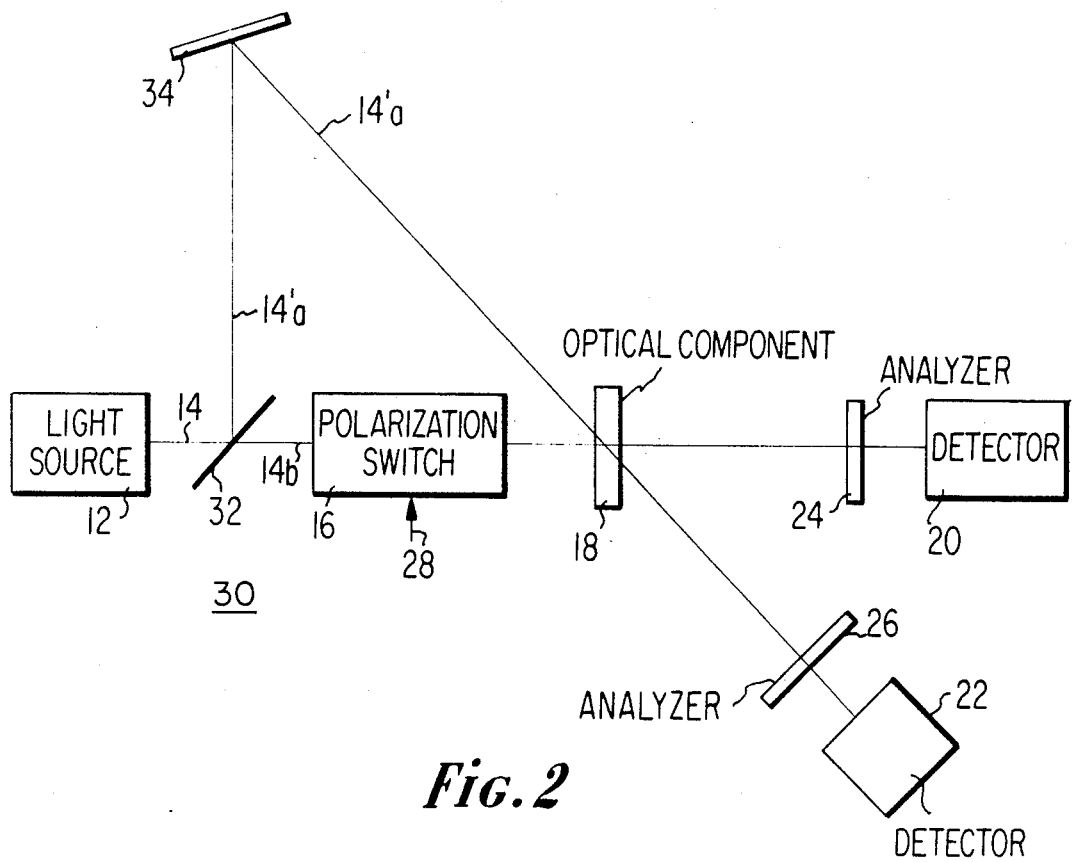
FIG. 2 is a schematic illustration of a system for recording a predetermined hologram in the electro-optic material used in the embodiment of FIG. 1.

In order to provide a better understanding of the operation of the digital laser beam deflection system of FIG. 1, reference is now made to FIG. 2 wherein there is shown a system for recording a hologram in the optical component used in the embodiment of FIG. 1. The system of FIG. 2 is similar to that of FIG. 1 and like elements bear like reference numerals. The recording system 30 includes a beam splitter 32 which may be a half silvered mirror or other suitable means. Beam splitter 32 splits the output beam 14 of laser source 12 into two beamlets 14a' and 14b'. A reflecting surface 34 is arranged in such a manner as to reflect beamlet 14a' toward optical component 18 thereby providing an object beam for the holographic recording process. The beamlet 14b' which is transmitted through beam splitter 32 and polarization switch 16 impinges on optical component 18, exhibiting the same polarization direction as the output beam 14 from source 12, thereby providing a reference beam for the holographic recording process. It should be noted that the reflecting surface 34 can be arranged so as to provide virtually any desired incidence angle at which beamlet 14a' impinges upon optical component 18. Accordingly, this incidence angle determines the emergence angle of beamlet 14b at the opposite surface of the transparent optical component 18. It will be readily apparent that it is this emergence angle which determines the deflection angle of output beam 14b shown in FIG. 1.

The hologram is recorded in optical component 18, in accordance with the physical arrangement of the optical apparatus shown in FIG. 2, by exposing optical component 18 to the interference pattern created by the beams until the interference pattern produces a corresponding variation of the index of refraction along a given direction. In the case of an electro-optic crystal material, the given direction is the C-axis. Preferably, the polarization direction of the beams is in the plane defined by the propagation direction of the two beams.

As discussed in the second of the above-referenced U.S. Pat. applications, the holographic information recorded in this manner may be fixed so as to provide a non-destructive hologram which is insensitive to subsequent readout light. For example, either during or after the recording process, the optical component material may be heated to approximately 100°C for a predetermined time period. In one case, using crystals of $LiNbO_3$ or $Ba_2NaNb_5O_{15}$, the predetermined time period at 100°C was on the order of 30 minutes. One convenient method for heating the optical component material, either during or after the recording process, is to force heated air or gas into thermal contact with the material, such as, for example, with a heat gun blower.

After the hologram has been recorded (and preferably fixed) the beam splitter 32 and reflecting surface 34 may be removed from the system; it can be seen that the remaining elements form a system which is identical to the configuration shown in FIG. 1. Referring again to FIG. 1, it should now be apparent that system 10 provides a laser beam deflection system wherein the position of the output beam at detector 20 or detector 22 is determined by the polarization of the output beam 14 from source 12. The output beam 14 essentially provides a reference or readout beam for reading out the holographic information content of optical component 18. When the polarization of output beam 14 is parallel to the C-axis of optical component 18, the output beam will be diffracted by the holographic pattern and therefore deflected toward detector 22. However, when the polarization of output beam 14 is perpendicular to the C-axis of optical component 18, the output beam will be transmitted through the transparent material of optical component 18 substantially undiffracted. It should be noted that any residual beams either transmitted or deflected toward the unwanted direction will exhibit a polarization perpendicular to the pass-polarization of analyzers 24 and 26. Thus, the detected outputs at detectors 20 and 22 can provide virtually 100 percent on-off modulation of the laser beam when the system, as shown in FIG. 1, is used to provide a digital laser beam steering system.

Although the above-described holographic recording technique has been described as utilizing beams of coherent light polarized along one given direction, in the plane defined by the propagation direction of the two beams, it is also possible to establish an interference pattern with both light beams polarized along the orthogonal direction. That is, the recording process itself is not polarization-direction sensitive. What is essential, however, is that the electro-optic effect in the optical component material be pronounced along a given direction within the material. The recording can also be accomplished with the polarization of the two beams exhibiting a non-parallel relationship. However, in this case, the intensity of the resulting light intensity pattern would be proportionately reduced in accordance with the angle between the two polarization directions.

Another important advantage of this holographic recording technique, in accordance with the present invention, is that the process is reversible. That is, the thermally fixed hologram can be readily erased, such as, for example, by heating the optical component material to approximately 300°C for a predetermined time period which permits the space charge and therefore the accompanying electric field to neutralize throughout the volume of the material. By way of another example, the hologram can also be erased by heating the optical component material to approximately 100°C while exposing it to uniform light of the proper wavelength in order to excite the trapped electrons which results in charge neutrality throughout the volume. Thus, the same optical component material can be used repeatedly.

In addition to the wide deflection angle capability discussed above, the optical system in accordance with the present invention has the advantage that the optical apparatus can be accurately set up and aligned at the recording location prior to recording the hologram without necessitating further alignment during or after recording the holographic information in the optical component. That is, in most applications, no further alignment is required after once having established the proper recording alignment conditions.

Another important advantage of the present invention is that the obtainable diffraction efficiency can be and has been found to be on the order of 90 percent when using optical component materials of the type discussed above.

A still further advantage, provided by the present invention, is that more than one hologram can be recorded within the volume of a thick optical component material by simply changing the angle of the object beam for each new hologram to be recorded. Hence, multiple output beams can be obtained utilizing this property of a thick phase-holographic information storage medium. Additionally, it should be noted that the optical component can provide a complex optical system in that the induced index of refraction variation is capable of altering the nature of the wavefront at the same time that it deflects it.

Figure 3:
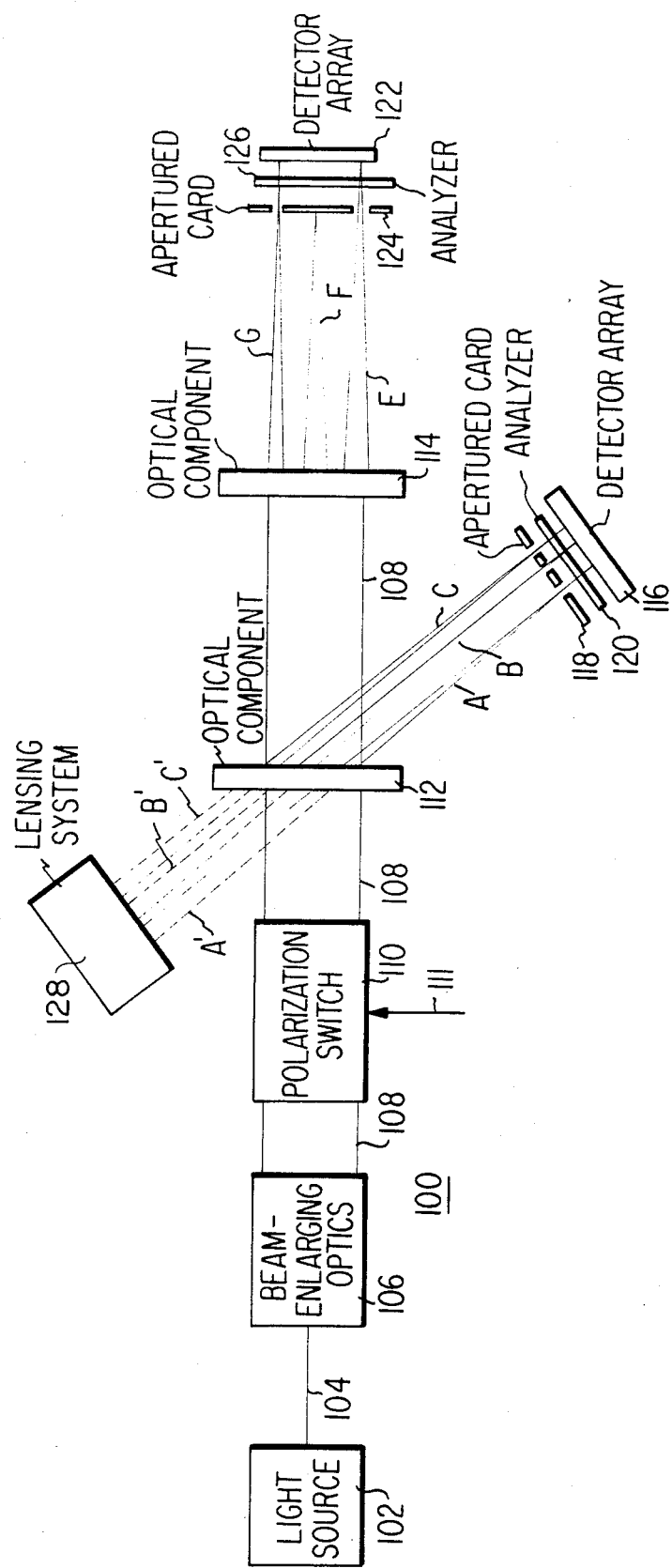
FIG. 3 is a schematic view of an optical system using a complex optical component, illustrating another manner in which the present invention may be used.

An optical system using a complex optical component is shown generally at 100 in FIG. 3. A light source 102 provides a beam of polarized coherent light 104 which impinges on beam-enlarging optics 106. Beam-enlarging optics 106 may comprise, for example, a beam expanding lens followed by a collimating lens. The output from beam-enlarging optics 106 provides a collimated beam of light 108, which may exhibit a substantial cross-sectional area and which is transmitted through polarization switching device 110. The output of polarization switch 110 acts to rotate collimated beam 108 into one of two mutually orthogonal states in response to the application of an input signal at the control input 111 of polarization switch 110. In one orthogonal state collimated beam 108 is transmitted through optical component 112 and impinges on optical component 114. In the other mutually orthogonal state, collimated beam 108 encounters a varying index of refraction within the volume of optical component 112 which diffracts the collimated beam to provide deflected beamlets A, B and C. The impinging beam 108 at optical component 114 which corresponds to the first mutually orthogonal state encounters a variation in the index of refraction of optical component 114 and is thereby diffracted to provide beamlets E, F and G.

The nature of the holographic information stored in optical component 112 causes the deflected beamlets A, B and C to converge to points at the surface of a detector array 116. An apertured card 118 is disposed in the path of the beamlets between optical component 112 and detector array 116. Analyzer 120 is, in turn, positioned between apertured card 118 and detector array 116. Similarly, the nature of the holographic information stored in optical component 114 causes the beamlets E, F and G to converge to points at the surface of detector array 122. A second apertured card 124 is disposed in that path of the beamlets between optical component 114 and detector array 122. Analyzer 126 is in turn positioned in the path to the detector array 122, for example, as shown between apertured card 124 and detector array 122.

For purposes of illustration, a lensing system 128 is shown in FIG. 3 which may be used as a complex object beam for recording the desired holographic information in optical components 112 and 114 in a manner which is similar to the technique disclosed with reference to FIG. 1. Lensing system 128, which may include appropriate optics and a light source, provides output beamlets A', B' and C' which are depicted as dotted lines. As in the example of FIG. 1, the recording process may be achieved by exposing the optical components to the interference pattern of a reference beam such as provided by collimated beam 108 and the object beamlets A', B' and C' as provided by lensing system 128. The object or second beam may also be provided, however, by a beam that has either been reflected from an object or has traversed a transparency of the object.

The apertured cards 118 and 124 include a predetermined number of openings or apertures provided therein, such as may be found, for example, on an identification card as used in a card reading system or the like. The detector arrays 116 and 122 may be used to provide an output when a predetermined number or combination of beamlet rays pass through the apertured cards 118 or 124. Accordingly, detector arrays 116 and 122 may each comprise either a one dimensional array of individual detectors or a two dimensional matrix of detectors, depending on the geometric format of the apertured cards. Thus, in this configuration, optical system 100, which utilizes complex optical components to provide complex light output wavefronts, may be used as a card reading or recording system.

It should be readily apparent that in operation optical system 100 provides deflected beamlets A, B and C when the polarization of collimated beam 108 is parallel to the C-axis of optical component 112. When the polarization of collimated beam 108 is perpendicular to the C-axis of optical component 112, collimated beam 108 is transmitted through optical component 112 and impinges on optical component 114. Optical component 114 is oriented so as to have its C-axis perpendicular to the C-axis of optical component 112 and therefore parallel to the polarization of collimated beam 108 as transmitted through optical component 112. Analyzers 120 and 126 are each oriented in that direction which virtually eliminates the presence of any residual beam at their respective detectors. It should be noted that the ability to alternate the direction of collimated beam 108 in response to a control signal applied to control input 111 of polarization switch 110 provides a particular utility in a card reading or recording system in that the beam can be switched to a waiting card while the card at the alternate position is replaced or advanced.

It should be noted that the complex optical component applications of the present invention are not limited to deflection systems per se. Moreover, the complex optical component can be used to diffract an impinging readout beam or readout plane wave into a variety of complex patterns or images. For example, several stages of complex optical components may be cascaded between a suitable coherent light source and a target position or screen. The polarization of the impinging light at each optical component may be separately controlled by a polarization switching device in series with and preceding each stage. Thus, by appropriately controlling the polarization state of the impinging light at each optical component, the final pattern displayed at the target or screen can be solely determined by the holographic pattern recorded in any one of the cascaded optical components. Of course, the concept of cascading several optical component stages can be useful in a more conventional digital beam deflector system in order to obtain a plurality of distinct output beam positions.

It should be noted that the present invention will find particular utility in optical systems in that a single holographic recording facility can be used to generate a number of complex adaptive optical components. Thus, each desired system can be recorded in a separate optical component by using a common set of complex optical recording equipment—thereby permitting simultaneous operation of several individual complex systems without necessitating a plurality of non-holographic components.

While the optical component material of the present invention has been described as preferably being a crystalline material, it should be appreciated that other materials such as a transparent organic material which exhibits a pronounced electro-optic effect along a given direction can be used to provide equally good results.

Thus, there is provided in accordance with the present invention a highly effective optical system using adaptive holographic components facilitating, notably, laser beam deflection.

What is claimed is:

1. In an optical system, the combination comprising:

first means for producing a beam of polarized coherent light;
   beam-enlarging means disposed in the path of said light beam for providing a collimated beam of light having a given cross-sectional area;
   second means operating on said collimated beam for selectively controlling said collimated beam to be polarized in either one of two mutually orthogonal directions in response to the application of a control signal; and
   optical component means disposed in the path of said collimated beam, said optical component means comprising a substantially transparent electro-optic material whose index of refraction along a given direction varies in accordance with the interference fringes of a predetermined holographic pattern that has been recorded therein, said electro-optic material being positioned in said path with said given direction oriented to deflect a significant amount of said collimated beam in accordance with said pattern to a first target position while altering the spatial cross-section of said collimated beam, said deflection occurring only when said collimated beam has one of said mutually orthogonal polarization directions and for transmitting substantially all of said collimated beam to a second target position when said collimated beam has the other of said mutually orthogonal polarization directions.

2. The optical system according to claim 1, wherein said material comprises an electro-optic crystal having its C-axis aligned along one of said mutually orthogonal directions.

* * * * *